United States Patent [19]

Cloudy

[11] 4,062,202
[45] Dec. 13, 1977

[54] VIBRATORY WEIR ASSEMBLY AND METHOD FOR SEPARATING FOODS BEING FROZEN DURING FLUIDIZATION IN A FOOD FREEZING TUNNEL

[75] Inventor: Westley Ray Cloudy, Edmonds, Wash.

[73] Assignee: Cloudy & Britton Inc., Edmonds, Wash.

[21] Appl. No.: 668,634

[22] Filed: Mar. 19, 1976

Related U.S. Application Data

[62] Division of Ser. No. 482,781, Sept. 5, 1974, abandoned.

[51] Int. Cl.² ............................................. F25D 25/04
[52] U.S. Cl. ..................................... 62/380; 34/164; 198/752
[58] Field of Search ................ 62/63, 266, 345, 375, 62/380; 34/164; 198/752, 759, 760, 767, 771, 340

[56] References Cited

U.S. PATENT DOCUMENTS

| | | | |
|---|---|---|---|
| 2,157,339 | 5/1939 | Jeffery et al. | 198/771 |
| 2,776,741 | 1/1957 | Carrier, Jr. | 198/370 |
| 3,245,155 | 4/1966 | Allen et al. | 34/164 |
| 3,338,385 | 8/1967 | Sage | 198/771 |
| 3,545,098 | 12/1970 | Eichholz et al. | 34/164 |
| 3,768,174 | 4/1972 | Biaggi | 34/164 |

*Primary Examiner*—Ronald C. Capossela
*Attorney, Agent, or Firm*—Roy E. Mattern, Jr.

[57] ABSTRACT

Vibratory weir assemblies, in selected embodiments, are respectively installed in food freezing tunnels to cause at the outset of the freezing operations complete separation of pieces of foods, such as french fries, so they will be individually frozen during the remaining fluidization freezing travel through a food freezing tunnel. Previously prepared foods, such as precooked french fries, moving into a food freezing tunnel on a mesh conveyor, are confronted by a vibrating weir located just above the mesh conveyor. By the time the food pieces are vibrated up and over the vibrating weir each one is free of the other, so subsequently, as they progress on a mesh conveyor, the fluidizing and freezing air circulates completely about them. The vibrating weir is actuated principally up and down with some translatory movement, by using an overhead mechanism having an appearance of modified advancing and shaking mechanisms previously used under shaking tables and/or advancing and shaking conveyors. The food vibrating weir mechanism, however, is equipped with counter weight and action components to isolate the vibrations from the other components of the food freezing tunnel. As necessary, the vibratory food weir assemblies include their own heating units to keep a food unit such as a french fry from sticking to the food weir assembly.

5 Claims, 7 Drawing Figures

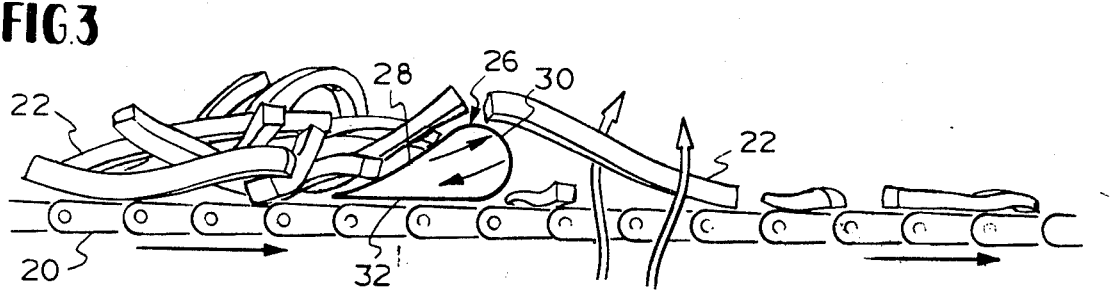
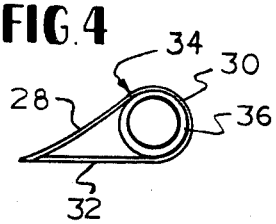
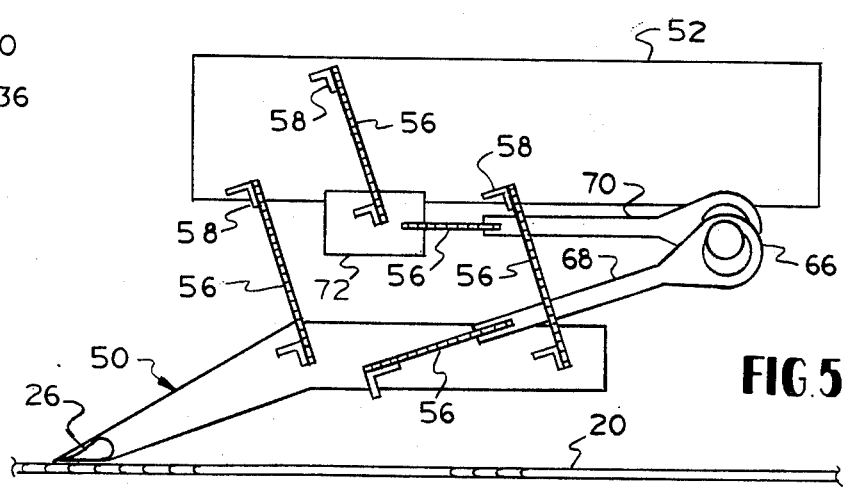
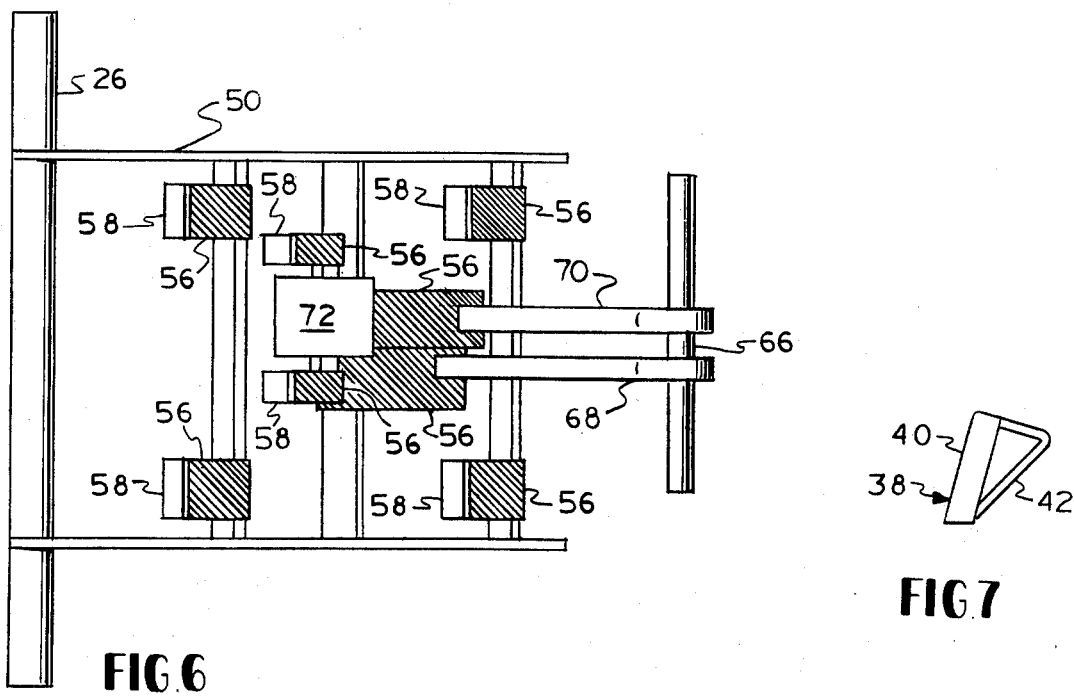

VIBRATORY WEIR ASSEMBLY AND METHOD FOR SEPARATING FOODS BEING FROZEN DURING FLUIDIZATION IN A FOOD FREEZING TUNNEL

CROSS REFERENCE TO RELATED APPLICATIONS

This application is a division application of my earlier copending application of the same title, Ser. No. 482,781, filed Sept. 5, 1974, now abandoned and, also at this time a continuation application of this same earlier application is being filed.

BACKGROUND OF THE INVENTION

In the past during the freezing of foods such as french fries and peas, which are undergoing fluidization in a food freezing tunnel, transverse stationery rod abutments have been positioned as a temporary barrier to oncoming foods traveling on a conveyor. During the congestion of the foods at the rod some separation of the food into single units is undertaken. Yet many food units remain adhered to one another during the balance of the freezing period in traveling the remaining length of the freezing tunnel. The fluidization currents of freezing air are not able to separate most of the adhered food units, such as french fries or peas.

Also in the past, as indicated in the U.S. Pat. 2,274,292 issued to Mr. Miller, Jr. in 1942, a conveyor belt moving foods is shaken to try to separate the food units. In U.S. Pat. No. 2,300,229, issued to Mr. Knowles in 1942, a prefreezer shaker conveyor is used to try to separate the food units. In U.S. Pat. 2,385,140 in 1945, also issued to Mr. Knowles, he again illustrates a food shaker conveyor. In U.S. Pat. No. 3,425,237 issued in 1969, Mr. McLeese discloses his vibrating foraminous tray involving both vertical and horizontal components of vibratory forces as refrigerated air is passed by the food items traveling along the vibrating tray.

The problem therefore of separating food units and keeping them separated so they are completely frozen as separate units has been and still is well recognized and many solutions have been and are being offered. Yet there has remained a need for a better apparatus and/or method to be both installed and thereafter operated at lower overall cost, which would be much more effective in separating units of food such as french fries and thereafter keeping them separated during the freezing periods of their preparation.

SUMMARY OF THE INVENTION

By using vibratory weir assemblies and methods, food units such as french fries, after cooking and air cooling are separated and moved on mesh conveyors as freezing and fluidizing air flows are passed up through the mesh conveyor openings, thereby assuring the effective fluidization freezing of the separated food units, as they are completely frozen from all outer surfaces. The air circulating equipment, the overall housing, the mesh conveyors, and the freezing means of these food freezing tunnels are all spared from reacting to the vibrations of the weir assembly. This occurs, because the food weir assembly is designed as a self sustaining unit having an essentially independent suspension subassembly which includes its own counterweight subassembly to keep all the vibratory and reactive balancing forces essentially contained within its own subassembly.

As a prepared food product such as french fries approaches the location of the food weir assembly, the exterior liquids on the food units are congealing. Moreover, the collective everchanging grouping of these food units, such as french fries, is constantly being forced by the conveyor operation and vibratory food weir operation to remain accumulated during the congealing of the surface structures of all the food units. Being prevented from readily passing over the food vibratory weir, the agitating accumulation of food nits in their interaction among themselves, in the presence of the moving conveyor, the fluidizing cooling air, and the vibrating food weir, tends to cause theffood units to become thoroughly separated as individual units before reaching the apex of the vibrating food weir assembly. Thereafter, individually they tumble over the weir and remain well separated and spaced for the remaining conveyor run through the food freezing tunnel.

By utilizing the effective vibratory food weir assembly with the non vibrating mesh conveyor of the food freezing tunnel, the mesh conveyor speed is advanced and the overall fluidization freezing operation is effectively run at a higher production capacity than those production capacities obtained in operating food freezing units using shaking tables and/or, vibrating conveyors in lieu of non vibratory conveyors, or stationary weirs i.e. an abutment positioned just above an operating non vibrating conveyor. Moreover, the vibratory weir assembly is readily installed into existing food freezing tunnel equipment, which utilizes a non vibrating food conveyor and the method is likewise readily practiced. Moreover the weirs themselves are per se interchangeable to provide respective better performances when different foods are being frozen. One weir cross sectional form is better for accumulating, separating, and passing french fries; whereas another weir cross section form is better for accumulating, separating, and passing peas.

DESCRIPTION OF THE DRAWINGS

FIG. 3 is an enlarged partial cross sectional view to also show the accumulation of the food units, such as french fries, advancing to the vibratory weir and then their free unitary exit therefrom;

FIG. 4 is an enlarged cross section of an embodiment of a vibratory weir which has its internally arranged heating unit which keeps the food units from adhering to the exterior of the vibratory weir;

FIG. 5 is an enlarged partial cross sectional view to somewhat schematically indicate the overall relationship and operation of the vibration producing components and the counterbalancing components of the mechanisms of the food vibratory weir assembly, which therefore during operations shake only the vibratory food weir and not the framing and other components of the food cooling and freezing tunnel;

FIG. 6 is an enlarged partial top view of the components shown in FIG. 5 to also somewhat schematically indicate their overall relationship and operation to produce the effective localized vibrations of the food weir; and FIG. 7 is an enlarged cross section of an embodiment of a vibratory food weir of another cross sectional form which is more effective in first accumulating and then individually passing vegetables like peas, in contrast to french fries which are more effectively handled by the food weir illustrated in FIGS. 3 and 4.

DESCRIPTION OF THE PREFERRED EMBODIMENTS

General Environment Where Vibratory Food Weir Assembly is Installed

Figure 1:
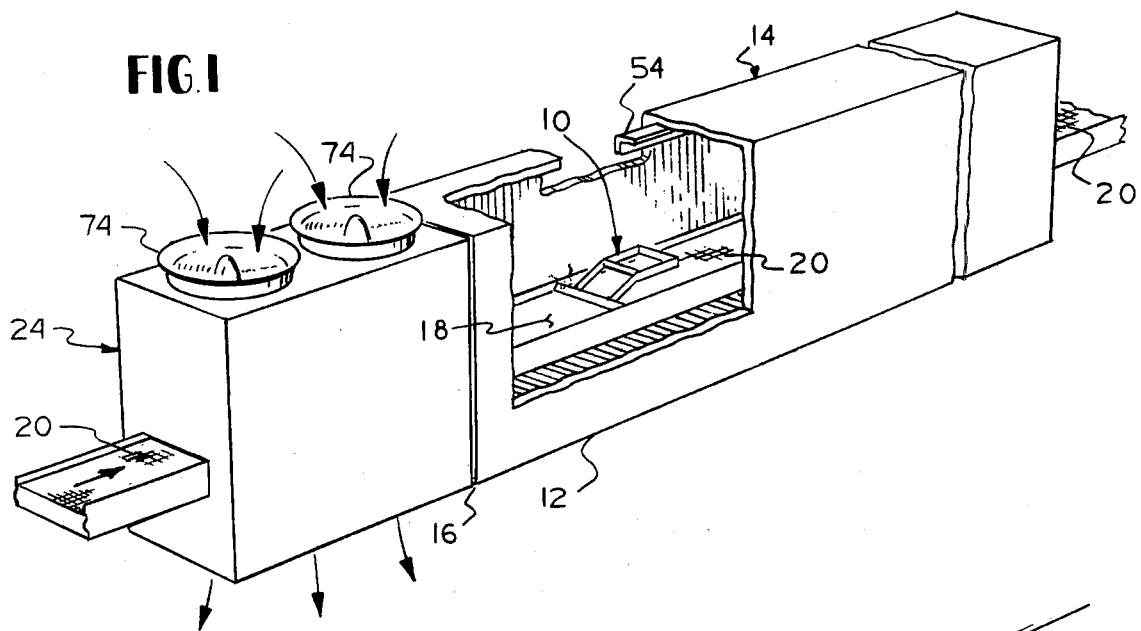
FIG. 1 is a perspective view of a food fluidization cooling and freezing tunnel with portions removed to show the location of the vibratory weir assembly for separating the food units being frozen and with portions removed to indicate the freezing tunnel is longer than shown.

At present, as illustrated in FIG. 1, the vibratory food weir assembly 10 is positioned near the entrance of freezing portion 12 of the overall freezing tunnel 14. It is sufficiently positioned beyond the entry 16 of the freezing portion 14 to create a food unit accumulation volume 18 located over a wire mesh belt food conveyor 20, which is transporting the food units 22 throughout the overall freezing tunnel 14. The precooked food units 22, such as french fries, are delivered from a product loader, not shown, to the food conveyor 20, which transports them through an air cooler 24 of the overall freezing tunnel 14. Thereafter, the food units 22 are conveyed into the freezing portion 12 of the overall freezing tunnel 14.

During the cooling and the commencement of the fluidizing freezing, the congealing of the food unit surface liquids, if the food units 22 are in contact with one another, causes them to adhere to one another. If they so remain during the follow on freezing operation, the freezing of the food units 22 is ineffective to an extent which is undesirable. Therefore, near the outset of the freezing portion 12, after allowing a sufficient accumulation volume 18, the vibratory food weir assembly 10 is installed to effectively cause the complete separation of all food units 22, before their continued conveyor travel throughout the remaining length of the overall freezing tunnel 14. The successful operation of the vibratory food weir assembly 10 makes it possible to speed up the conveyor 20 and/or shorten the length of the freezing portion 12 of an overal freezing tunnel 14.

Various Types of the Food Weir, Per Se

Figure 2:
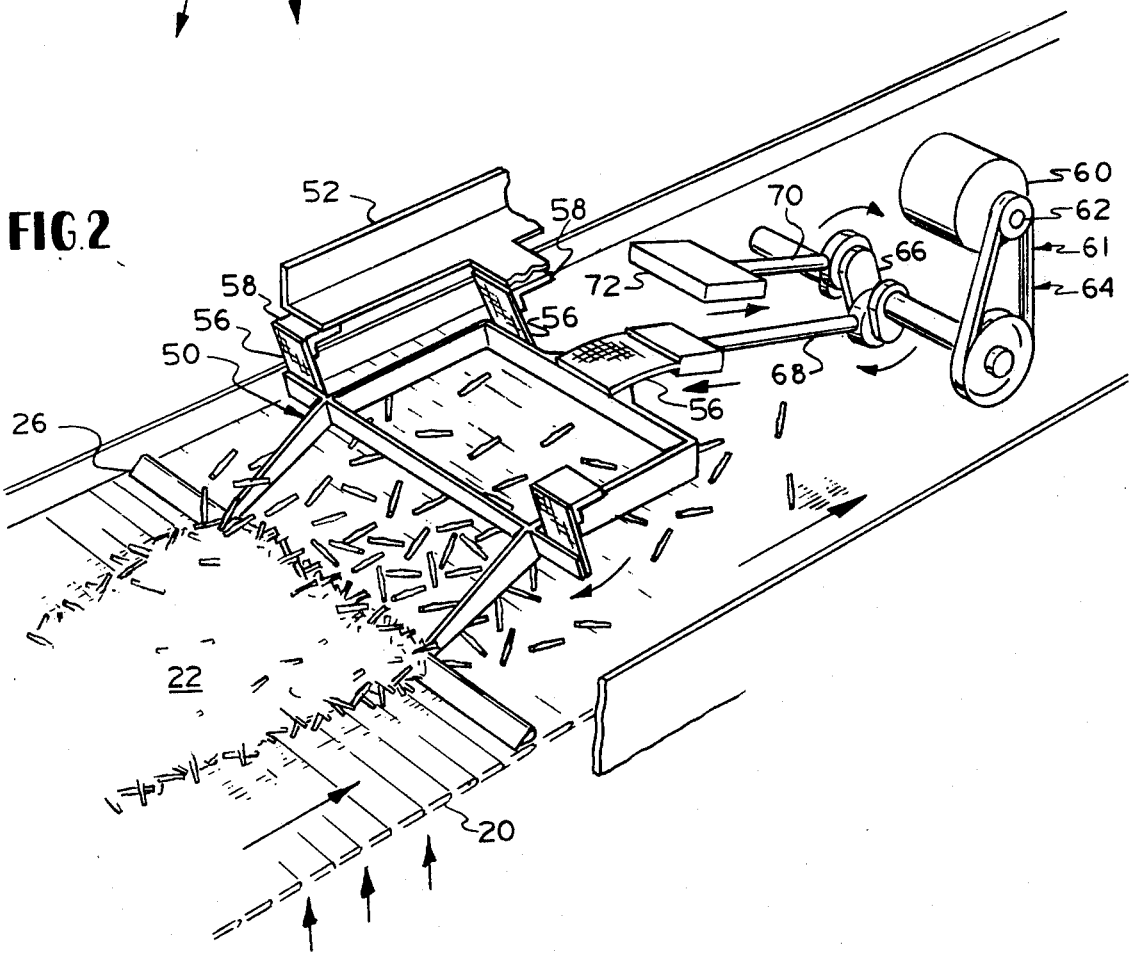
FIG. 2 is an enlarged partial perspective view of this food tunnel to somewhat schematically indicate the overall relationship and operation of the vibratory weir assembly, indicating the accumulation of the food units advancing to the vibratory weir and their free unitary exit therefrom.

As indicated in FIGS. 1, 2 and 3, the food weir, per se, 26, has a cross sectional shape which appears as a scoop, having a concave ramp surface 28, entering to a rounded return surface 30 and terminating in a planar bottom 32 to rejoin the lower portions of the ramp surface 28. As illustrated in FIG. 4, a food weir 34 is heated by hot air being supplied through its internal duct 36. Food weirs 26 and 34 are effective in first building up an accumulation and then separating food units 22, such as french fries, which have a tendency to intertwine in moving and sticking together. Other configurations for food weirs are used for controlling other food units 22, such as peas. As illustrated in FIG. 7, food weir 38 has an inclined abutment surface 40 having a somewhat triangular return surface 42. Vegetables, such as peas, are more effectively accumulated and thereafter separated by using this food weir 38.

All food weirs 26, 34 and 38 are positioned just above the wire mesh belt conveyor 20 and oscillated parallel to the conveyor 20 during their vibrations. The motion of the conveyor 20 drives the food units 22 into an ever changing grouping of food units 22 as they accumulate ahead of the blocking vibratory food weirs 26, 34 and 38. After the accumulation reaches a level approaching the top of the food weirs and beyond, the pressing forces created in the accumulated pack of food units 22 combined with the vibratory force movements of the food weirs 26, 34 and 38, result in the food units 22, such as french fries, being separated from one another and delivered at spaced intervals to the conveyor 20. When so separated their very effective freezing is undertaken as the fluidizing freezing air flow reaches all the exterior surfaces of each food unit 22, thereby quickly and thoroughly freezing the food units 22, which thereafter tend to remain separated.

Vibration Subassembly for Vibrating the Food Weirs

As illustrated in FIGS. 2, 5 and 6, often schematically, the food weirs, such as the ramp food weir 26, are interconnected at their transverse ends to a vibration subassembly 50. It is designed to be connected to a supporting sub-frame 52, indicated in part, secured in turn to the principal frame 54, indicated in part, or secured directly to the principal frame 54 of the overall freezing tunnel 14, by using shock absorbing spring board fiberglass support straps 56 having attachment terminals 58, such as the angles which are illustrated in FIGS. 2, 5 and 6.

An electric motor serving as the power unit 60 is mounted to the supporting subframe 52 or the principal frame 54 of the overall freezing tunnel 14. Its drive shaft 62 is connected to a belt drive 64 which in turn drives an eccentric mechanism 66. The latter mechanism 66 has a connecting rod 68 secured to a shock absorbing spring board fiberglass support strap 56, which in turn is secured to the vibration subassembly 50. Also the eccentric mechanism 66 has other connecting rods 70 secured to a counterweight 72, which in turn is supported from the subframe 52 or principal frame 54 using shock absorbing spring board fiberglass support straps 56 and attachment terminals 58.

Operation of the Vibratory Food Weir Assembly

When the wire mesh belt conveyor 20 is operated to commence the transport of food products through the air cooler 24 as it is made operational with its intake fans 74 in motion, soon thereafter the power unit 60 is turned on. Through the power train of the drive shaft 62, belt drive 64, eccentric mechanism 66, connection rod 68, the vibration subassembly 50 is placed incontinuing motion. As a consequence, whatever food weir is being used is placed in vibratory motion. This vibratory motion of the food weir coupled with the continuing conveyor motion provides resultant motion vectors which are active on the soon to be accumulated pack of food units 22. They in turn act upon and are acted upon by other food units 22 causing their separation from one another before they are toppled over the food weir and spaced individually for continued travel through the fluidizing freezing tunnel.

Each vibratory motion of the vibration subassembly 50 without destroying its effective purpose is however counterbalanced by a moving counterweight 70 also driven by the same power train, terminating however in different connecting rods 70. All these vibrating parts and counterweights are suspended from a subframe 50 and/or principal frame 54 by utilizing shock absorbing hanging supports 56, often made of spring board fiberglass composite laminated materials. As an important consequence, the other components of the overall freezing tunnel 14 are effectively spared from the long term wear and possible destruction to be otherwise caused by the creation of the vibration which were not so isolated.

SUMMARY OF ADVANTAGES OF INSTALLING AND OPERATING THE VIBRATORY FOOD WEIR ASSEMBLY

The vibratory food weir assembly is conveniently installed in existing overall food freezing tunnels. When in operation the vibratory food weir assembly successfully separates the food units one from the other, and causes their spaced delivery to the conveyor carrying them on through the fluidizing freezing portion of the overall food freezing tunnel. Such separation and spacing insures their faster more uniform freezing. Consequently, the overall operating capacity of an overall freezing tunnel is substantially improved.

In this respect, when new overall freezing tunnels are to be designed, consideration is given to reducing the overall length of the freezing portion because of its more effective utilization in freezing food units which are excellently separated and spaced on the conveyor by operating the vibratory food weir assembly.

At all times, the isolation of the needed vibration forces is readily undertaken. Also throughout the design, stainless steel materials are conveniently used where contacts with the food units are to be expected, and lubricants associated with mechanisms may be well isolated from the traveling food units. Moreover, the fluidization flow patterns are not adversely effected.

I claim:

1. In combination with a food unit freezing tunnel having a non vibrating food unit conveyor operating throughout its length, a vibratory food weir assembly installed in the first portion of the food unit freezing tunnel, after freezing has commenced but well before the freezing has been completed, and operated while the food unit freezing tunnel is operated to cause the separation of all the food units from one another, if previously stuck together, before the food units are conveyed throughout the remainder of the freezing tunnel, the vibratory food weir assembly and food unit freezing tunnel comprising:
   a. a food unit freezing tunnel having a non vibrating conveyor throughout its length,
   b. a vibratory food weir assembly, comprising, in turn:
      1. an elongated transverse food weir serving as a bar like deflector-separator, when arranged immediately above and across a food unit non vibrating conveyor in the path of travel of the food units, to cause the food units to be intercepted briefly by the food weir, to pass upwardly over the food weir, and fall by gravity from the food weir immediately back onto the non vibrating food unit conveyor, after only leaving the non vibratory food conveyor for the very short distance under the food weir,
      2. means for vibrating the elongated transverse food weir to aid the separation of the food units, previously stuck together, as they are caused to pass upwardly over the food weir and immediately back down to the non vibrating food unit conveyor, and
      3. means to mount the vibrating means and elongated transverse food weir as a vibratory food weir assembly and mount the vibratory food weir assembly to the food unit freezing tunnel having the non vibrating food unit conveyor operating throughout its length.

2. In combination with a food unit freezing tunnel having a non vibrating food unit conveyor operating throughout its length, a vibratory food weir assembly, as claimed in claim 1, wherein the elongated transverse food weir serving as the bar like deflector-separator has a scoop like cross section with the entry of the scoop commencing parallel to the top of the non vibrating food unit conveyor and thereafter curving upwardly to provide a short guiding path for the food units as they are caused to be lifted briefly off the non vibrating food unit conveyor, such scoop like cross section food unit weir, being particularly useful when the food units being separated are french fries, being frozen in the freezing tunnel, while being conveyed on a non vibrating conveyor.

3. In combination with a food unit freezing tunnel having a non vibrating food unit conveyor operating throughout its length, a vibratory food weir assembly, as claimed in claim 1, wherein the elongated transverse food weir serving as the bar like deflector-separator has an inclined abutment like cross section of a constant abrupt angle of inclination with respect to the top of the non vibrating food unit conveyor, to provide a short guiding path for the food units, as they are caused to be lifted briefly off of the non vibrating food unit conveyor, such inclined abutment like cross section food unit weir being particularly useful when the food units being separated are peas, being frozen in the freezing tunnel, while being conveyed on a non vibrating conveyor.

4. In combination with a food unit freezing tunnel having a non vibrating food unit conveyor operating throughout its length, a vibratory food weir assembly, as claimed in claim 1 comprising, in addition, a heating means for heating the elongated transverse food weir and for being mounted on the means used in mounting the food weir and the vibrating means.

5. In combination with a food unit freezing tunnel having a non vibrating food unit conveyor operating throughout its length, a vibratory food weir assembly, as claimed in claim 1, wherein the means for vibrating the elongated transverse food weir, in turn comprises a power unit, drive train subassembly, and counter weight subassembly arranged to isolate all other components of the food unit freezing tunnel from the vibrations of the vibrating food weir assembly.

* * * * *